United States Patent [19]
Salyer et al.

[11] 3,929,939
[45] Dec. 30, 1975

[54] LARGE VOID-FREE POLYETHYLENE CASTINGS COMPRISING HIGH DENSITY POLYETHYLENE IN A LOW DENSITY POLYETHYLENE MATRIX

[75] Inventors: Ival O. Salyer, Dayton; Charles J. North, West Carrollton, both of Ohio

[73] Assignee: Monsanto Research Corporation, St. Louis, Mo.

[22] Filed: Dec. 13, 1973

[21] Appl. No.: 425,894

Related U.S. Application Data

[63] Continuation of Ser. No. 219,498.

[52] U.S. Cl........ 260/897 A; 260/42.39; 260/42.46; 264/331
[51] Int. Cl.². ........................................... C08L 23/06
[58] Field of Search.. 260/897 A, 94.96 A, DIG. 32; 161/252

[56] References Cited
UNITED STATES PATENTS

| | | | |
|---|---|---|---|
| 2,919,474 | 1/1960 | Cole | 18/59 |
| 3,231,636 | 1/1966 | Snyder et al. | 260/897 |
| 3,474,051 | 10/1969 | Chappelear et al. | 260/2.5 |
| 3,478,132 | 11/1969 | Randolph | 260/897 X |
| 3,511,742 | 5/1970 | Rasmussen | 260/897 X |

*Primary Examiner*—Murray Tillman
*Assistant Examiner*—C. J. Seccuro
*Attorney, Agent, or Firm*—Bruce Stevens

[57] ABSTRACT

Large void-free castings of polyethylene can be made by blending high density polyethylene pellets with low density polyethylene powder, followed by heating to above the melting point of the low density polyethylene and below, or only slightly above, the melting point of the high density polyethylene. Flame proofing additives, crosslinking agents and other materials can be readily incorporated into the blend before fusing. The mixture of high density and low density polyethylene significantly reduces the amount of shrinkage which takes place during the cooling from the melting temperature to ambient temperature. The low density polyethylene should have a sufficiently low melt viscosity so that it will flow under small pressures above the melting temperature.

2 Claims, No Drawings ized as c
LARGE VOID-FREE POLYETHYLENE CASTINGS COMPRISING HIGH DENSITY POLYETHYLENE IN A LOW DENSITY POLYETHYLENE MATRIX This is a continuation of application Ser. No. 219,498, filed Jan. 20, 1972, now abandoned.

BACKGROUND OF THE INVENTION

This invention relates to polyethylene castings and more particularily to a composite of high density polyethylene embedded in low density polyethylene and the method of making such castings.

Polyethylene has become an important commercial product. It is produced from ethylene monomer, a gas derived from natural gas or from the cracking of crude oil. A high pressure reaction with trace amounts of oxygen as a catalyst produces "high pressure" or "low density" polyethylene. This material is also known as "conventional" polyethylene.

Other polyethylene polymers, known as "low pressure" or "high density" polyethylene, are well known in the art. These ethylene polymers have very different properties from the low density polyethylene, and are prepared by reacting ethylene monomer in the presence of a metallic oxide catalyst. Polymers so produced may be linear, or may contain controlled amounts of branching. Nominal densities of high density polyethylene are from 0.939 to 0.965 gram per cc.

The American Society for Testing and Materials types polyethylene as follows: Type 1 is low density polyethylene having a mass per unit volume ranging from 0.910 to 0.925 gram per cc; Type 2 is medium density with a density ranging from 0.926 to 0.940 gram per cc; and Type 3 is high density polyethylene with a density ranging from 0.941 to 0.960 gram per cc.

High density polyethylene having a weight average molecular weight of above 1.5 million, as determined by viscosity measurements, is called ultrahigh molecular weight polyethylene. Essentially linear in structure, it has some properties superior to those of linear high density polyethylene of lower molecular weight.

A number of blends of these polyethylenes have been made to achieve particular properties and are well known in the prior art. For example, U.S. Pat. No. 3,194,850 teaches a homogeneous blend of two or more polyethylene resins of different molecular weight by forming a melt of the resins, cooling the resins to form a solid, and reducing the solid blend to a finally divided state and remelting. Simularly, U.S. Pat. No. 3,592,881 teaches the preparation of a heat-sealable film prepared by crosslinking an oriented film of a blend of low density and high density polyethylenes for packaging. The latter patent is directed toward providing a heat shrinkable polyethylene film having a broad heat sealing range which is suitable for use on automatic packaging equipment.

Polyethylene is typically used for wire and cable coatings and can be molded by a number of techniques such as thermoforming, rotational molding, injection molding, film extrusion, and blow molding; however, thick castings of polyethylene are difficult to prepare because of shrinkage which either causes the polyethylene to pull away from the walls of the mold during cooling or causes voids in the center of the casting. The present invention is directed toward a process and a composition to make large void-free castings of polyethylene.

SUMMARY OF THE INVENTION

It is one object of this invention to provide a process to cast large void-free castings of polyethylene. It is another object to provide a composition of matter that can be used for large void-free castings of polyethylene.

These and other objects are achieved by a composite material which comprises 25 to 50 weight percent low density polyethylene and 50 to 75 weight percent high density polyethylene embedded in the low density polyethylene. The invention further contemplates a method of making a void-free molding of polyethylene which comprises the steps of placing in a mold a blend of 25 to 50 weight percent low density polyethylene powder with 50 to 75 weight percent high density polyethylene particulates, heating the blended polyethylene particulates to a temperature above the melting point of the low density polyethylene, but below the temperature at which the high density polyethylene will flow causing the molten low density polyethylene to flow to fill the voids, and thereafter cooling the blended void-free polyethylene composite.

The polyethylene composite can be conveniently cast by mixing a powder and pellets. Ideally, the powder is the lower density polyethylene having a size range of about 16 mesh to 50 mesh and the pellets are the higher density polyethylene having a size range of about one-sixteenth inch to one-fourth inch on a side, or even larger. Cubic pellets are preferred, although spheres and cylinders or platelets can also be used. The mixture of powder and pellets provide a higher apparent density than either powder or pellets alone, which is advantageous because it minimizes the shrinkage of the casting during the melting and solidification. The small particle size powder also provides a large surface area for better distribution of powder or liquid additives. The pellets in the blend improve abrading action during the blending cycle and thus help breakdown lumps or agglomerate of any additives that are present.

It is desirable that the pellets have a higher melting point than the powder. Conveniently, the powder may be Type 1 polyethylene while the pellets are Type 2 or 3, or the powder may be Type 2 and the pellets may be Type 3. Indeed it has been found that ultrahigh density polyethylene is quite satisfactory. For the process to operate successfully it is essential that the powder used as the matrix binder have a sufficiently low melt viscosity such that it will flow under small pressures at the melting temperature; for example, the melt index of the low density polyethylene powder as determined by A.S.T.M. procedures should probably be at least 0.1 decigram per minute and preferably 1 to 20 decigrams per minute. The use of low density polyethylene having a melt index substantially higher than about 40 decigrams per minute would result in castings which would become brittle at low temperature and would have poorer tensile strength and elongation than those of lower melt index.

The melt viscosity of the high density polyethylene is not critical since in most cases it will not be heated above its melting point. However, a melt index in the same general range of 0.1 to 20 decigrams per minute as specified for the low density powder is desirable, although a melt index up to 40 decigrams per minute would be satisfactory.

It has been found that the ratio of high density pellets to low density powder is critical. A satisfactory composite can be made using 50 to 75 percent by weight of high density polyethylene pellets blended with 50 to 25 percent by weight of low density polyethylene powder. At less than 25 percent polyethylene powder the composite contains voids due to the shrinkage of the low density polyethylene when it is melted. At above 50 percent low density polyethylene the high density polyethylene pellets are not evenly distributed in the composite, causing density gradients in the completed casting.

The composite of low density and high density polyethylene may contain additives to achieve desired properties. As an example, flame-proofing additives and crosslinking agents can be readily incorporated into the blend before fusing. Crosslinking can be achieved by incorporating from about 0.5 to about 5 weight percent of an organic peroxide crosslinking agent, such as dicumyl peroxide, in the composition and curing at temperatures of about 175° to about 200°C. The crosslinked polyethylene exhibits the same crystalline melting point as the original resins. When the crosslinked polymer is heated to a temperature above the crystalline melting point, it is converted from a plastic to a rubbery melt. On cooling the polymer reverts to a plastic. Crosslinked polyethylene resins provide a material with enhanced properties, especially creep resistance at high temperatures and stress cracking resistance. Other additives such as antioxidants, and in some instances ultraviolet light stabilizers, can be added to the blend before fusing to achieve desirable characteristics.

It has also been found that a composite of high density polyethylene fibers can be blended with low density polyethylene powder to produce a composite having superior properties. As an example, when sheets of this composite are prepared by the same techniques as used to prepare a composite using high density polyethylene particles and low density polyethylene powder, the composite containing the fibers are substantially more resistance to tear than the low density polyethylene alone.

The void-free composites are prepared by placing in a mold a blend of 25 to 50 weight percent low density polyethylene powder with 50 to 75 weight percent high density polyethylene pellets or fibers and heating the blended polyethylene to a temperature above the melting point of the low density polyethylene, but below the melting point, or only slightly above, say 25°C. above, the melting point of the high density polyethylene. When only a very slight pressure is applied to the mold, the molten low density polyethylene will flow to fill the voids and thus imbed the high density polyethylene in the low density polyethylene. Thereafter, the casting is cooled to form a void-free polyethylene composite.

A particularily advantageous composition contains 33 percent low density polyethylene powder and 67 percent high density polyethylene pellets.

Higher pressures can advantageously be used to expedite flow of the low density polyethylene and help to significantly shorten the molding cycle. However, pressures of several thousand pounds per square inch (p.s.i.), such as typically used in injection or extrusion molding are not necessary or desirable. Molding pressures of 0–100 p.s.i. and not greater than 1,000 p.s.i. are contemplated.

An important distinction of the composites of this invention from the prior art products can be observed upon visual examination. During the process to prepare these composites, the polyethylene is heated above the melting point of the low density polyethylene, and perhaps above the melting point of the high density polyethylene. Since the molten polyethylene is not stirred, the high density polyethylene will crystallize first upon cooling, and the separate phase structure of the high density polyethylene wil be preserved, and is clearly visible.

An excellent radiation shield suitable for shipping neutron sources was prepared by blending 1 to 10 weight percent boric acid with 30 to 50 parts of low density polyethylene powder and 50 to 70 parts of high density polyethylene pellets. The neutrons produced by the reaction of an atomic particle on a light element, such as boron or beryllium, are reflected by the hydrogen in the polyethylene and the boron incorporated as an additive. Thus, neutron sources having an emission of $1 \times 10^7$ neutrons per square meter per second can be successfully shipped without exposing those nearby to radiation by embedding the source in a shield of the polyethylene composite of this invention.

DESCRIPTION OF THE PREFERRED EMBODIMENTS

The invention is further illustrated by but not limited to the following examples.

EXAMPLE 1

About 21.6 parts of MPE 210 pellets, a high density, blow molding polyethylene resin having a density of about 0.955 grams per cubic centimeter available commercially from Monsanto Company, St. Louis, Miss. was blended with 10.75 parts of Microthene 720 a finely divided, low density polyethylene available commercially from U.S. Industrial Chemical Company, New York, N.Y., which has a density of 0.915, a melt index of 12, and particles less than 40 mesh and 1.77 parts of boric acid. The various components were tumble blended for about 45 minutes and placed in a large steel mold approximately 13 inches by 13 inches by 19 inches high. The mold containing the blended ingredients was placed in an oven at 130°C. for 16 hours. A lid was then placed on top of the ingredients and the gentle pressure of the lid caused the molten low density polyethylene to flow to fill any voids. The mold was heated in an oven at 130°C. for another 16 hours. The long heating times were necessary to permit the heat to penetrate the polyethylene. When the steel mold containing the blended polyethylene was cooled and the casting removed, a large void-free composite of high density polyethylene pellets in a low density polyethylene matrix was obtained.

EXAMPLE 2

The process of Example 1 was repeated using 21.6 parts of MPE 210 and 21.6 parts of Microthene 720 with 2.4 parts of boric acid and heated for 16 hours at 150°C. A large void-free casting was obtained which was satisfacotry for use as a nuclear radiation shield for neutron-emitting radiation sources.

EXAMPLE 3

The procedure of Example 1 was repeated except that the blended composition contained about 9806 grams of MPE 210, 4881 grams of Microthene 720, 804 grams of boric acid, and 309 grams of Dicup R. The ingredients were placed in the stainless steel mold and heated to 150°C. overnight. Samples cut from the large block revealed that the casting was void-free.

Upon heating the casting, it became rubbery, but did not exhibit melt flow, indicating the crosslinking with the Dicup R had occurred.

Dicup R is recrystallized dicumyl peroxide, available commercially from Hercules Company, Wilmington, Del.

Although the invention has been described in terms of specified embodiments which are set forth in considerable detail it should be understood that this is by way of illustration only and that the invention is not necessarily limited thereto since alternative embodiments and operating techniques will become apparent to those skilled in the art in view of the disclosure. Accordingly modifications are contemplated which can be made without departing from the spirit of the described invention.

We claim:

1. A composite material which comprises 50 to 75 weight percent high density polyethylene pellets having a size range of about one-sixteenth inch to one-fourth inch in a matrix of 25 to 50 weight percent low density polyethylene.

2. A composite of claim 1 wherein the polyethylene is crosslinked with about 0.5 to about 5.0 weight percent dicumyl peroxide.

* * * * *